United States Patent Office 3,113,289
Patented Dec. 3, 1963

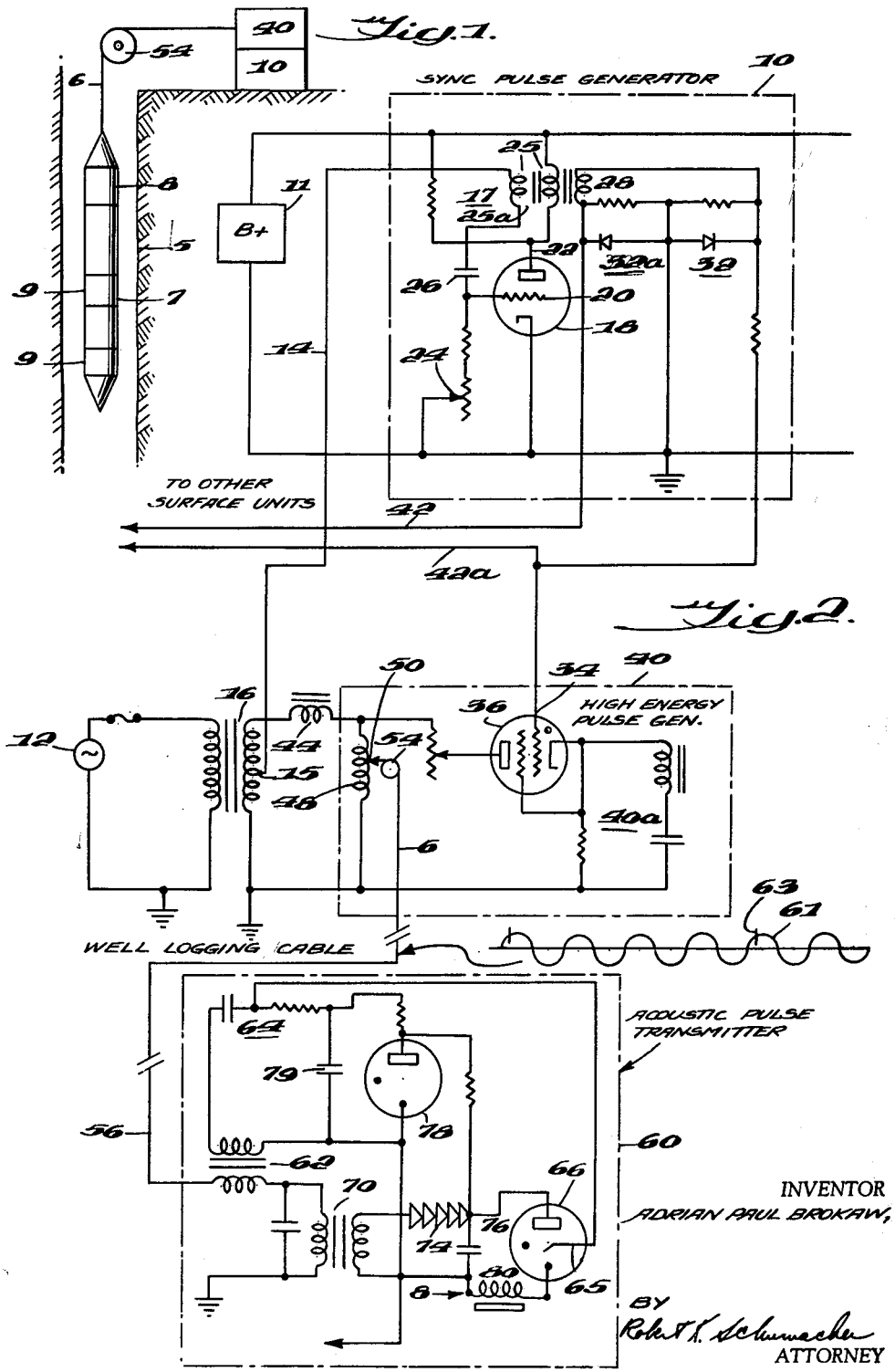

3,113,289
TRIGGER GENERATOR FOR ACOUSTIC WELL LOGGING SYSTEMS
Adrian P. Brokaw, Tulsa, Okla., assignor, by mesne assignments, to Dresser Industries, Inc., Dallas, Tex., a corporation of Delaware
Filed Jan. 16, 1959, Ser. No. 787,213
8 Claims. (Cl. 340—18)

The present invention relates to generators for acoustic well logging systems, and more particularly to means for generating a trigger pulse synchonized with a sub-multiple or sub-harmonic of the power frequency used to energize the acoustic well logging system.

In acoustic well logging, it is common practice to those familiar with the logging operation to use equipment lowered into a well bore hole. This equipment may have a free-running oscillator or generator for providing electrical pulses to an acoustic pulse transmitter. The acoustic pulse transmitter then generates acoustic energy pulses at the same rate as the repetition rate of the free-running oscillator.

The difficulty with the use of a free-running oscillator in sub-surface equipment is that it does not provide control over the sampling rate of the logging equipment in analyzing the sub-surface formations about the bore hole.

Another difficulty encountered with a free-running oscillator is that the electrical pulses produced vary in time and amplitude, so that when they are applied to an acoustic transducer, its output also varies in period and energy causing unwanted changes in the received signal.

It is possible to provide an acoustic well logging tool in which a power frequency current is supplied from the surface through a supporting cable to the acoustic well logging tool. It is also possible that the acoustic well logging tool may generate acoustic pulses at a sub-multiple of the power frequency. In such an arrangement, however, it is found that it is difficult for either the power frequency or the sub-multiple frequency to synchronize the operation of any surface equipment that may be used in recording or analyzing the information derived from the acoustic well logging tool.

There are additional difficulties encountered in using a free-running generator in a sub-surface tool as a synchronizing means. Since the generator is free-running, variations in temperature in the well bore as well as changes in the applied voltage due to changes of physical characteristics of the logging cable affect the stability of the generator and may change the repetition rate of the synchronizing pulses.

It is, therefore, an object of the invention to provide means to control the sampling rate of an acoustic logging tool in analyzing sub-surface formations about a bore hole.

It is also an object of the invention to synchronize the sampling rate of an acoustic logging tool with a sub-multiple frequency of the power frequency provided at the earth's surface, that is, where the sampling rate is $f/n$, where $f$ is the power frequency and $n$ is any positive integer.

Further, it is an object of the invention to provide means to synchronize the acoustic well logging tool with surface equipment used to analyze the information derived from the logging tool. This provides a system uniformity.

It is a further object of the invention to provide an acoustic logging tool with electrical energy at power frequency and convert the electrical energy into acoustic energy at a sub-multiple repetition rate controlled from the earth's surface.

Accordingly, the present invention is directed to a circuit arrangement or system for acoustic well logging equipment in which there is provided at the earth's surface a master trigger or sync pulse generator coupled through a well logging tool cable to an acoustic logging tool. The generator is energized by a power frequency current and the generator develops pulses at a repetition rate that may be changed from a repetition rate equal to the power frequency to another sub-multiple of the power frequency. The pulses may synchronize any surface equipment related with the acoustic well logging system, but particularly are the pulses used to synchronize and control the sampling rate of the acoustic pulse transmitter in the acoustic well logging tool. An interconnecting well logging cable is provided to couple the synchronizing means with the logging tool.

Perhaps the outstanding advantage of the new circuit arrangement resides in an acoustic pulse transmitter in an acoustic well logging tool that is synchronized at a sub-multiple frequency of a power source at the earth's surface. Although the acoustic pulse transmitter as well as acoustic receivers in the acoustic well logging tool and other interconnected equipment therein are each energized by a power source at the earth's surface, the acoustic pulse transmitter is not activated to a free-running condition by the power source to develop acoustic energy in the well bore. The trigger pulse from a sync pulse generator at the earth's surface is the only means for activating the acoustic transmitter.

Other objects and advantages will be apparent from a detailed description of the invention and from the appended drawings and claims.

In the drawings:
FIG. 1 is a diagrammatic view of an acoustic well logging tool in a well bore hole according to the present invention; and
FIG. 2 is a schematic diagram of the circuit elements according to a preferred embodiment of the invention.

Referring now to FIGS. 1 and 2, there is shown a well bore hole 5 which extends downward from the surface of the earth through various strata. Only one stratum is shown although several may be encountered throughout the length of the bore hole. Suspended on a cable 6 within the bore hole is a tool 7. One portion of the tool contains a transmitting transducer 8 for converting high-energy electrical pulses into high-energy acoustic pulses. The acoustic energy is radiated from the tool into the formation surrounding the bore hole 5.

Also within the tool are acoustic energy receivers 9, 9 for picking-up acoustic energy passing through the formations.

A synchronized pulse generator 10 is part of the acoustic well logging service equipment. The sync pulse generator is shown as being energized by a conventional D.C. power supply 11 connected to the sync pulse generator. A frequency reference is supplied to the sync pulse generator by a connector 14 coupled to a tap 15 on a secondary winding of a transformer 16. The sync pulse generator may be any conventional form of frequency divider in which fifty or sixty cycle power is used to develop pulses having a repetition rate at a sub-multiple frequency of the power source. One form of frequency divider is a non-resonant or relaxation oscillator such as a blocking oscillator 17. The blocking oscillator is in a relaxation oscillator circuit in which the anode current of the tube 18 is periodically blocked by a large negative bias on the grid 20. The anode circuit 22 and the grid circuit 20 of the tube are magnetically closely coupled in transformer 25. The grid circuit includes inductance 25a and capacitance 26. The grid leak 24 is of a high value.

When oscillation begins, grid current flows into the capacitance 26 and develops across it a grid bias many times the plate current cut-off value. In this way the anode current of the tube is blocked after an interval dependent on the electrical characteristics of the transformer 25, and oscillation ceases. The negative charge on the capacitance 26 now leaks slowly through the grid leak 24, and after a time period, depending on the value of the grid leak 24, the anode circuit 22 becomes conductive again, oscillation starts and the cycle recommences. The frequency reference coupled over connector 14 tends to trigger the blocking oscillator only on positive going wave fronts of the frequency reference. In this manner the sub-multiple frequency of the blocking oscillator is determined by adjustment of grid leak 24.

The closely coupled magnetic circuit of the transformer 25 is inductively coupled to an output circuit by a winding 28. The master trigger pulses produced by the blocking oscillator circuit are coupled from the winding 28 through a clamping network 32 to a control grid 34 of the thyratron 36. The thyratron is part of a high-energy pulse generator 40. The overshoot pulse from the winding 28 is coupled through a clamping network 32a to synchronize other surface units of the acoustic well logging system (not shown) by way of a conductor 42. This pulse occurs at the end of the blocking oscillator cycle and is therefore delayed in time from the master trigger.

The master trigger pulse may be obtained for synchronizing other surface units by conductor 42a. These trigger or sync pulses generated by the sync pulse generator 10 may be of the same frequency as the A.C. power frequency, or are at another sub-multiple frequency, the pulses being synchronized with the corresponding positive going wave fronts of the A.C. power frequency. In the other surface units of the acoustic well logging system, the master or delayed trigger pulse prepares or enables the surface equipment to operate.

The high-energy pulse generator 40 is used to receive pulses from the sync pulse generator 10 and shape the pulses in a wave shaping circuit 40a. The thyratron 36 generates a high-energy trigger pulse. The thyratron 36 of the high-energy pulse generator is energized by the A.C. power source 12 coupled through a power transformer 16. The secondary of the power transformer is directly coupled to the plate circuit of the thyratron 36 through an inductance 44. The inductance 44 serves to isolate the transformer 16 from the pulses that are developed and shaped by the high-energy pulse generator.

Connected across the secondary of the transformer 16 there is an auto-transformer 48 through which passes current from the secondary of the transformer 16 as well as shaped high energy pulses from the output of the thyratron 36. A sliding tap 50 is provided on the auto-transformer to provide controllable output to the acoustic well logging cable 6. A winch 54 is used for raising or lowering an acoustic well logging tool 7 shown in FIG. 1, which is suspended at the lower end of the acoustic well logging cable 6. Within the acoustic well logging tool there is an acoustic pulse transmitter 60 shown in FIG. 2 for generating acoustic energy to pass into portions of the surrounding formations.

From the auto-transformer 48 there passes along the well logging cable 6 current from the A.C. power source 12 and high-energy pulses that have been developed by the high-energy pulse generator 40. A diagrammatic representation of the power frequency being superposed by the high-energy pulses is shown as wave form 61, in which, for example, the pulses are shown on every fourth cycle. The circuit parameters of the sync pulse generator 10 may be adjusted so that the high-energy pulse superposed on the power frequency as shown in wave form 61 may be superimposed at the peak, the trough, or an intermediate position of the wave form as shown at point 63. The preferred form of the invention provides for superimposing the high-energy pulse at a point 63 just below the peak portion of every fourth cycle of the power current.

The high-energy pulse after passing along the well logging cable 6 is detected in the acoustic pulse transmitter 60. This detection is accomplished by the pulse being coupled through a pulse transformer 62 and a differentiating network 64 to the grid 65 of a cold cathode trigger tube 66. The plate current power supply for the cold cathode trigger tube 66 is furnished through a 60-cycle A.C. power transformer 70 in which the secondary circuit of the transformer is connected through a rectifier 74 to a charging capacitor 76. A sub-miniature voltage regulator tube 78 is coupled to control the charge of a capacitor 79. The voltage produced by the charge is used to pre-bias the trigger tube 66. In series with the cold cathode trigger tube 66 there is connected a winding 80 to which is applied a pulsed current. The winding 80 is part of the transmitting transducer 8 which may be a magnetostrictive or other similar type of transducer.

The power used to energize the coil 80 of the magnetostrictive type transducer is supplied from the discharge of capacitor 76 through the trigger tube 66 which is triggered by the high-energy pulse. In this way or manner the acoustic pulse transmitter provides an acoustic energy pulse coincident with the pulses produced by the frequency dividing blocking oscillator 16.

The sub-multiple frequency of the frequency divider circuit of the sync pulse generator may be changed by the adjusting of the circuit parameters such as the resistance of grid leak 24 so that a different repetition rate of the pulses is achieved. By varying the repetition rate of the sync pulse generator it is possible to control the sampling rate of the acoustic well logging system.

The foregoing illustrated embodiment will furnish a specific example of the application of the general principles of the invention and serve to illustrate its preferred form. However there are many other obvious modifications possible in the circuit as specifically described and it must be understood that the invention is not limited except as indicated by the scope of the appended claims.

What is claimed is:

1. In an acoustic well logging system having a source of alternating current, and having a transducer arranged and adapted to transduce said current into acoustic energy, the improvement in combination therewith comprising a frequency divider circuit adapted to generate electric pulses at a repetition rate functionally related to the frequency of said current, transformer means interconnected with said circuit to superpose said pulses on said current at a point between said source and said transducer, and a trigger circuit interconnected to said transformer means to receive said superposed pulses and in response thereto to repetitively actuate said transducer.

2. A well logging system comprising power means providing an alternating current, a pulse generator adapted and arranged to develop first pulses at a repetition rate that is a sub-multiple of the frequency of an coincident with a determined portion of said current, a pulse shaping network including a high-energy pulse generator and arranged and adapted to responsively develop second high-energy pulses functionally related to said first pulses, a pulse combining network interconnected to superpose said second high-energy pulses on said current, an acoustic pulse transducer, and a trigger circuit interconnected with said pulse combining network and said transducer, said circuit being adapted to detect said second high-energy pulses and in response thereto to apply rectified portions of said current to said transducer.

3. An acoustic well logging system comprising a source of A.C. energy, a frequency divider circuit adapted to superpose on said A.C. energy electric pulses at a repetition rate that is a sub-multiple of the frequency of said A.C. energy and that establishes between each of such pulses a substantially equal portion of said A.C. energy of at least a pre-determined charge, an acoustic energy transducer, and a trigger circuit arranged and adapted to receive said A.C. energy and to detect said pulses, said circuit being further arranged and adapted to apply said portions of said A.C. energy to said transducer in response to related ones of said pulses.

4. In an acoustic well logging system having an acoustic pulse transducer, and having a source of A.C. energy for developing current for transmission to said transducer, the improvement comprising a frequency divider circuit for developing pulses at a reptition rate that is a sub-multiple of the frequency of said A.C. energy and coincident with a portion thereof, combining means for superposing on said A.C. energy the pulses developed by the frequency divider, and a circuit responsive to said pulses for energizing said transducer with said A.C. energy developed by said source.

5. An acoustic well logging system for producing the transmission of acoustic energy in an acoustic well logging tool comprising a source of alternating current, a trigger pulse generator connected to said source current for developing trigger pulses at a sub-multiple of the power frequency, a pulse shaping network including a high-energy pulse generator for developing high-energy pulses, said pulse shaping network connected to said source to superpose said high-energy pulses functionally on a portion of said alternating current, and a circuit energized by the high-energy pulses to transduce said current into acoustic wave energy for propagation from the acoustic well logging tool.

6. An acoustic well logging system comprising a source of A.C. energy, a pulse generator developing first pulses at a repetitive rate that is a sub-multiple of the frequency of and concident with a predetermined portion of said energy, a pulse shaping network including a high-energy pulse generator for developing in response to said first pulses second high-energy pulses functionally related thereto, a pulse combining network connected to said shaping network for superposing the second pulses on said energy, an acoustic pulse transducer, rectifying means interconnected with said source to receive and rectify said energy, and a trigger circuit connected to said rectifying means and responsive to the superposed second high-energy pulses for applying the rectified energy to the acoustic pulse transducer.

7. An acoustic well logging system for providing pulse energy to an acoustic pulse transmitter, said system comprising a source of power frequency current, a pulse generator for developing first pulses at a repetition rate that is a sub-multiple of the frequency of and coincident with a predetermined portion of said current, a pulse shaping network interconnected with said pulse generator and including a high-energy pulse generator for developing second high-energy pulses, a pulse combining network for superposing upon the power frequency current the second high-energy pulses developed by the pulse shaping network, an acoustic well logging tool having a pulse transformer for separating the high-energy pulses from the power frequency current, and a power transformer for providing to the acoustic pulse transmitter a current at the times when the pulse transformer receives second high-energy pulses from the pulse combining network.

8. In an acoustic well logging system having an acoustic pulse transducer, the improvement comprising a source of alternating current, a frequency divider circuit for developing pulses at a repetition rate that is a sub-multiple of the frequency of said current, a pulse-combining network for superposing on said current the pulses developed by said frequency divider circuit, and a trigger circuit responsive to said pulses for actuating said acoustic pulse transducer.

References Cited in the file of this patent
UNITED STATES PATENTS

| | | |
|---|---|---|
| 2,496,392 | Hasbrook | Feb. 7, 1950 |
| 2,500,581 | Seeley | Mar. 14, 1950 |
| 2,542,644 | Edson | Feb. 20, 1951 |
| 2,750,794 | Downs | June 19, 1956 |
| 2,803,809 | Tilley | Aug. 20, 1957 |
| 2,931,455 | Loofbourrow | Apr. 5, 1960 |